No. 787,118. PATENTED APR. 11, 1905.
M. C. SCHWEINERT & H. P. KRAFT.
WATER BOTTLE STOPPER.
APPLICATION FILED JULY 19, 1904.

2 SHEETS—SHEET 1.

WITNESSES:
Fred White
René Ruine

INVENTORS
Maximilian Charles Schweinert
and Henry P. Kraft
By Attorneys,
Arthur E. Fraser & Co.

No. 787,118. Patented April 11, 1905.

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

WATER-BOTTLE STOPPER.

SPECIFICATION forming part of Letters Patent No. 787,118, dated April 11, 1905.

Application filed July 19, 1904. Serial No. 217,173.

*To all whom it may concern:*

Be it known that we, MAXIMILIAN CHARLES SCHWEINERT, residing at West Hoboken, in the county of Hudson and State of New Jersey, and HENRY P. KRAFT, residing in the city, county, and State of New York, both citizens of the United States, have jointly invented certain new and useful Improvements in Water-Bottle Stoppers, of which the following is a specification.

This invention aims to provide certain improvements in the construction of stoppers for water-bottles or the like, whereby their manufacture is facilitated and whereby especially the application of a washer thereto is facilitated.

A fastening device, preferably of metal, is first connected to the washer and is then introduced by a very simple movement into place upon the stopper-body, where it prevents accidental removal of the washer. The combined washer and fastening device constitute a separate article of manufacture adapted to be readily mounted upon the stopper-body. In this way the construction of the complete stopper is considerably simplified and cheapened.

The accompanying drawings illustrate embodiments of the invention.

Figure 1:
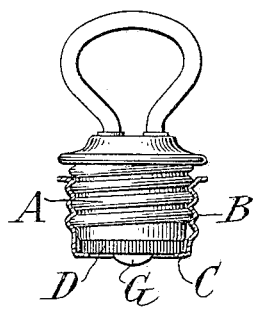
Figure 3:
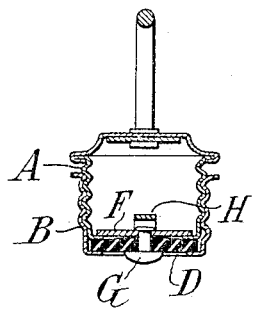
Figure 5:
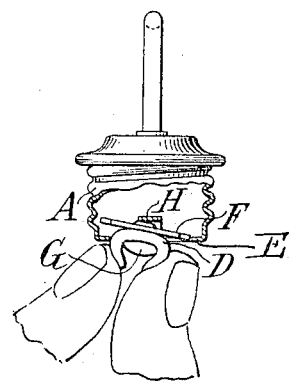
Figure 2:
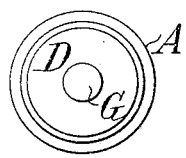
Figure 4:
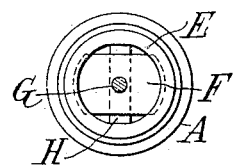
Figure 8:
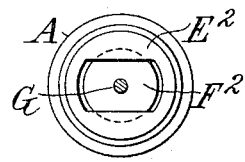
Figure 6:
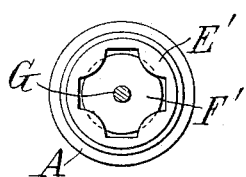
Figure 7:
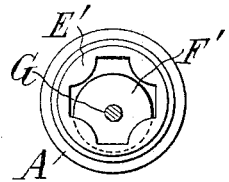
Figure 9:
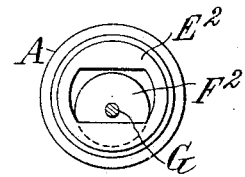
Figure 10:
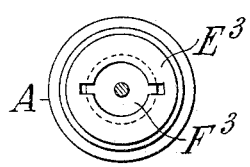
Figure 11:
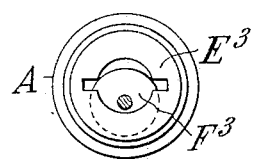
Figure 14:
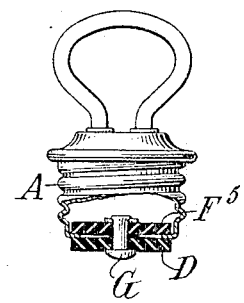
Figure 12:
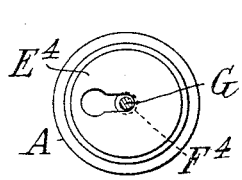
Figure 13:
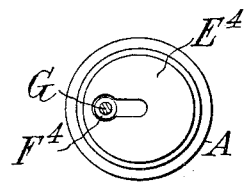
Figure 15:
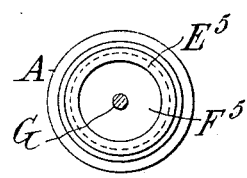
Figure 16:
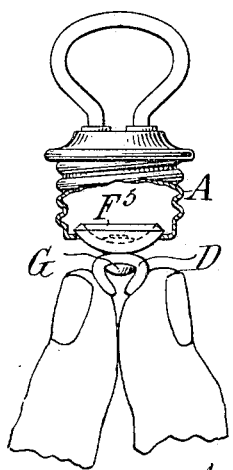

Figure 1 is a side elevation of a stopper in the usual socket. Fig. 2 is an under side plan view of the same. Fig. 3 is a central section at right angles to Fig. 1. Fig. 4 is an under side plan view of Fig. 3 with the washer cut off. Fig. 5 is a view similar to Fig. 3, showing the manner of applying the fastener to the body of the stopper. Figs. 6 and 7 are under side plan views illustrating another form of the invention with the fastener in its final position and in the act of being introduced, respectively. Figs. 8 and 9 are similar views of another form of the invention. Figs. 10 and 11 are similar views of still another form of the invention. Figs. 12 and 13 are similar views of still another form of the invention. Figs. 14, 15, and 16 are views similar to Figs. 3, 4, and 5, illustrating still another form of the invention, in which the retainer is of flexible and elastic material. In Figs. 6 to 13 and in Fig. 15 the washer is cut off.

Referring to the drawings, the stopper comprises a screw-threaded body portion A, upon the top of which are mounted a head and thumb piece or any other suitable means for screwing it into place. The stopper screws into a socket B, having at its lower edge an inward flange C. A washer D, of rubber or the like, is compressed between the bottom of the stopper and the flange C of the socket when the stopper is screwed home. The novel feature of the invention is in the manner of attaching the washer D to the body of the stopper or of any similar stopper. The body of the stopper comprises the screw-threaded vertically-extending portion and a horizontal bottom portion, through which there is an opening leaving around the edge a flange which may be of various shapes and dimensions. The washer is connected to a retainer, and the shapes of the flange and the retainer are such that the retainer in one position or another may be introduced within the flange and then turned to a position in which it cannot be withdrawn. For example, in Figs. 3, 4, and 5 the flange E is circular, while the retainer F is oblong and is attached to the washer D by a rivet G at the center. The length of the retainer is greater than the diameter of the opening within the flange. However, by bending the washer between the thumb and finger in the manner indicated in Fig. 5 and tilting the retainer it may be introduced endwise within the flange and then brought back to a horizontal position, so as to extend over the edge of the flange at its opposite ends. The rubber washer D holds it with a sufficient pressure against the inner face of the flange, and it cannot be accidentally withdrawn. It is preferred to provide a stop H, consisting of a strip of metal extending across the opening and a slight distance above it, so as to prevent the washer from being pushed through the hole in the bottom of the body.

In Fig. 6 the flange E' is provided with inward extensions, between which are four open spaces of greater diametral length than the diameter of the retainer, which, in this case, is a circular disk F'. The retainer can, by slightly bending the washer in the manner shown in Fig. 5, be introduced obliquely through either of the pairs of open spaces (see Fig. 7) and then shifted to a central position, where it will be held against removal, the rubber washer insuring a sufficient friction of the retainer against the inner face of the flange.

Figs. 8 and 9 illustrate a reversal of the construction shown in Fig. 3. The flange $E^2$ has an oblique opening through which a circular retainer $F^2$ is introduced by a lateral movement, as explained in connection with Fig. 7.

In the construction shown in Figs. 10 and 11 the flange $E^3$ has a small circular opening at the center with two diametrically-opposed slits, so as to give a clear space greater than the diameter of the circular retainer $F^3$, so that the latter may be introduced in the manner indicated.

According to Figs. 12 and 13 the flange $E^4$ is formed with a keyhole-shaped opening. The retainer $F^4$ is just small enough to pass through the enlarged end of the opening, after which it is pushed laterally, with the washer and rivet G, of course, to a central position, where it is held by friction.

According to Figs. 14 to 16, the retainer $F^5$ is of rubber or similar flexible and preferably elastic material and is introduced by squeezing its edges together in the manner indicated in Fig. 16. The flange $E^5$ and the retainer $F^5$ are preferably made circular in this construction. The washer D and the retainer $F^5$ are connected by a rivet G just as in the other constructions shown.

Though we have described with great particularity of detail certain embodiments of our invention, yet it is not to be understood therefrom that the invention is limited to the specific constructions disclosed.

Various other constructions may be made by those skilled in the art without departure from the invention.

What we claim is—

1. In combination, a stopper-body having an inward flange, a washer, and a separately-formed fastening device adapted to be passed through the opening within said flange and to engage said flange to hold said washer over said flange and prevent removal of the washer.

2. In combination, a stopper-body having an inward flange, a washer, and a rigid fastening device adapted to be passed through the opening within said flange and to engage said flange to hold said washer over said flange and prevent removal of the washer.

3. In combination, a stopper-body having an inward flange, a disk of packing material forming a washer, and a metal fastening device connected to the center of said disk and adapted to be passed through the opening within said flange and to engage said flange to hold said washer over said flange and prevent accidental removal of the disk.

4. In combination, a stopper-body having an inward flange, a washer, a separately-formed fastening device adapted to be passed through the opening within said flange and to engage said flange to hold said washer over said flange and prevent removal of the washer, and a stop within said body for limiting the inward movement of the fastener.

5. In combination, a stopper-body having an opening through its bottom leaving an inward flange around the edge, a disk of packing material extending over said flange to form a washer, and a metal fastening device connected to the center of said disk, the relative dimensions of said opening and said fastening device being such that the latter can be passed through the opening in one position and is held from withdrawal in another position.

6. In combination, a stopper-body having an opening through its bottom leaving a flange E around the edge, a disk D of packing material extending over said flange to form a washer, and a metal fastening device F riveted to the center of said disk having a width less than that of said opening and a length greater than that of said opening, whereby the fastening device may be tilted and passed through said opening.

In witness whereof we have hereunto signed our names in the presence of two subscribing witnesses.

MAXIMILIAN CHARLES SCHWEINERT.
HENRY P. KRAFT.

Witnesses:
DOMINGO A. USINA,
FRED WHITE.